(No Model.)
C. JAGELITZ.
DEVICE FOR STOPPING RUNAWAY HORSES.
No. 520,057. Patented May 22, 1894.
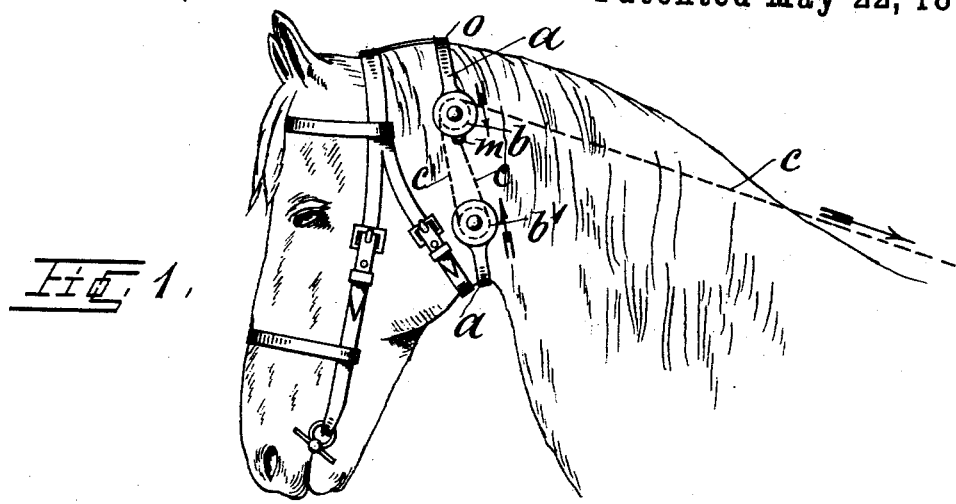
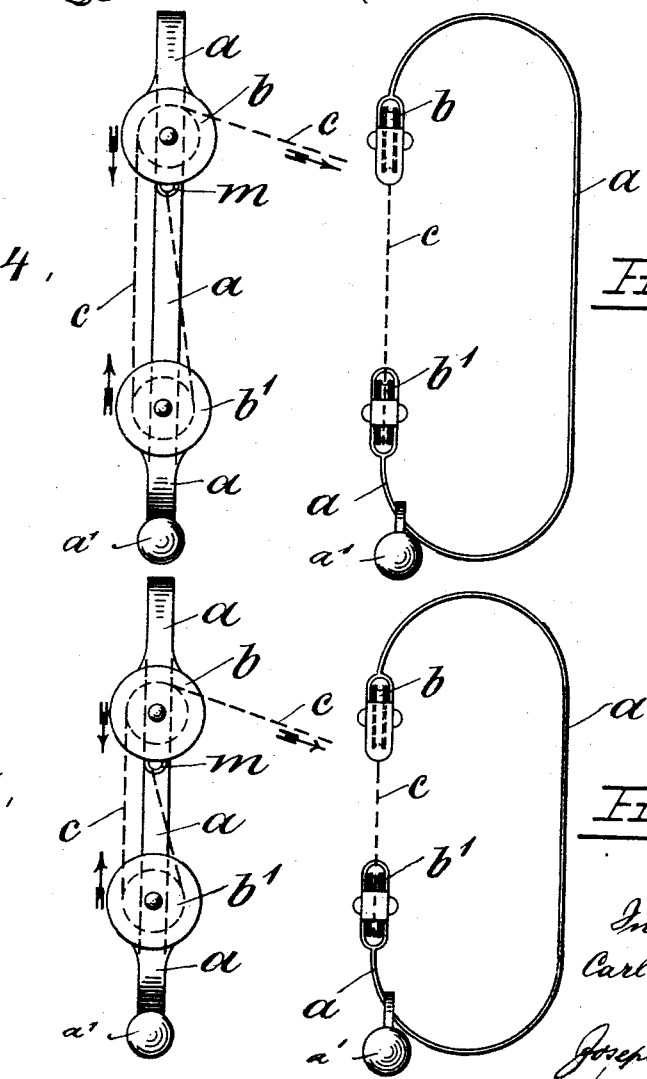
Witnesses:
Emil Savory
Paul Kuhnel
Inventor
Carl Jagelitz
by
Joseph Purath
Att'y.

UNITED STATES PATENT OFFICE.

CARL JAGELITZ, OF HUSUM, GERMANY.

DEVICE FOR STOPPING RUNAWAY HORSES.

SPECIFICATION forming part of Letters Patent No. 520,057, dated May 22, 1894.

Application filed June 27, 1893. Serial No. 478,940. (No model.)

*To all whom it may concern:*

Be it known that I, CARL JAGELITZ, a subject of the King of Prussia, German Emperor, residing at Husum, in the Kingdom of Prussia, German Empire, have invented a certain new and useful Improved Device for Stopping Runaway Horses, of which the following is a full, clear, and exact description.

The object of the present invention is to provide a device for stopping run-away horses and I attain this object by means of a band or cord slung round the horse's neck in the form of a sling, which can be controlled by the rider or coachman, so that when the said horse runs away or "bolts," the coachman by pulling the line tightens up the sling round the throat of the animal, and prevents its breathing freely, so that it is obliged to stop.

In order to make my present invention more easily intelligible reference is had to the accompanying drawings in which similar letters of reference denote similar parts throughout the several views.

Figure 1 is a sketch of a horse's head showing the arrangement of the sling device round the throat; Fig. 2 a front view of the sling when loose; Fig. 3 the same view with the sling closed; Fig. 4 a side elevation of Fig. 2 and Fig. 5 a side elevation of Fig. 3.

$a$ is a band encompassing the neck of the horse but not long enough to reach completely round. To each end of the said band are attached rolls $b\ b'$, while a cord or chain $c$ is attached to the bearing of the upper roll $b$ at $m$ passed under the lower roll $b'$ and over the upper roll $b$ and then on in the direction of the arrow (Fig. 4) to the coachman. The lower roll end of the band is weighted at $a'$.

The device operates in the following manner:—The chain or cord may also be attached to the bearing of the lower roll passed round the upper roll and taken on in the direction of the arrow to the coachman. As soon as the horse gets restive or bolts, the coachman pulls the line $c$ and tightens the sling $a$ round the throat of the animal, thus preventing its breathing freely and bringing it to a standstill. As soon as the horse has been stopped it will only be necessary to slack out the line $c$ and the sling loosens of itself by means of the weight $a'$.

It should be remarked that a very slight pull on the line will bring the horse up, so that there is no necessity whatever to injure the same in any way by partial strangulation.

The sling device should be preferably attached to the upper part of the headstall, as shown at $o$ in Fig. 1.

I claim as my invention—

The combination of the band $a$ having rolls $b$ and $b'$ the chain or cord $c$ attached to the upper roll bearing, and passing under the lower roll and over the upper roll, and a weight $a'$ arranged at the lower part of the band $a$ for the purpose substantially as described and shown.

In testimony whereof I have hereunto set my hand, at Berlin, this 10th day of June, 1893, in the presence of two subscribing witnesses.

CARL JAGELITZ.

Witnesses:
EMIL SAVORY,
PAUL KÜHNEL.